Nov. 7, 1950  B. G. RICH  2,528,784

VEHICLE DRAWBAR

Filed Aug. 21, 1948

INVENTOR.
B. G. RICH
BY
ATTORNEYS

Patented Nov. 7, 1950

2,528,784

UNITED STATES PATENT OFFICE 2,528,784

VEHICLE DRAWBAR

Barrett G. Rich, Waterloo, Iowa, assignor to Deere Manufacturing Co., Dubuque, Iowa, a corporation of Iowa Application August 21, 1948, Serial No. 45,531

8 Claims. (Cl. 180—53)

This invention relates to a vehicle drawbar construction and more particularly to such construction as applied to tractors of the agricultural or industrial type.

The invention contemplates and has for its principal object the provision of an improved drawbar construction providing for increased simplicity and rigidity by a construction which appropriately ties together the components of the drawbar frame with other components of the tractor structure. For example, the draft frame members are structurally tied together with supporting members included in an operator's station structure provided at the rear of the tractor. It is an important object of the invention to utilize to the fullest extent the structural characteristics of related members for the accommodation of both vertical and horizontal loading.

The foregoing and other important objects and desirable features inherent in and encompassed by the invention will become readily apparent from the following detailed description of a preferred embodiment of the invention as shown in the accompanying sheets of drawings in which.

Figure 1:
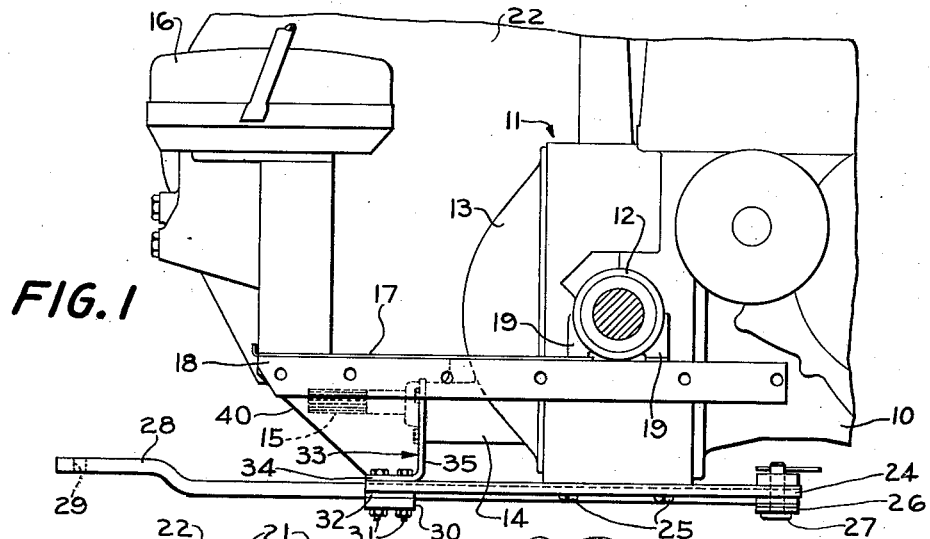
Figure 1 is a side view of the rear portion of a tractor, the near wheel having been omitted to expose the draft frame structure.

The tractor illustrated may be considered typical of several conventional tractors to the extent that it includes a generally longitudinally extending main body 10 and a transverse rear axle structure 11 having tubular axle housings 12 extending laterally outwardly respectively from opposite sides of the main body. In the present case, the axle structure 11 is of the type that is closed at its rear end by a housing or cover 13 which includes as an integral part thereof a sleeve or housing 14. The housing 14 projects rearwardly from the axle structure at a level below the lowest level of the axle housings 12 and provides means for journaling a rearwardly extending power take-off shaft 15.

The rear portion of the tractor includes an operator's station structure provided with a seat 16 which is mounted on a transverse plate 17 which forms a platform rearwardly of the axle housing 11. The transverse plate is supported on a pair of laterally spaced rearwardly extending supports preferably in the form of angle bars 18 secured at their forward portions respectively to mounting portions or pads 19 provided integrally with lower portions of the axle housings 12. Cap screws 20 may be used for securing the angle bars 18 rigidly to the axle housings 12. The plate 17 has its forward portion secured to the rearward mounting pads 19 by the rearward cap screws 20 and the plate is, of course, of sufficient strength to cross-brace the rear end portions of the angle bars 18. The plate is secured to the angle bars 18 by any suitable means, such as bolts 21. In the present illustration, the vertical flanges of the angle bars 18 serve as means for supporting a pair of laterally spaced, longitudinally running, upright fenders 22, the details of which are not important here, since they are included as part of the subject matter of assignee's co-pending application, Serial No. 44,162, filed August 13, 1948.

The intermediate portion of the axle housing 11 depends to a level considerably below the level of the mounting pads 19 and this portion is provided with a pair of laterally spaced mounting portions or pads 23. These pads serve to carry a draw frame structure including a pair of generally longitudinally extending hitch bars or members 24, each of which extends both forwardly and rearwardly of the axle housing structure 11. Cap screws 25 are indicated as the means by which the bars 24 are rigidly secured to the mounting pads 23. The forward ends of the bars 24 are rigidly cross connected by a transverse bar or member 26 which includes intermediate its ends a vertical pivot 27. This pivot may be of any desired construction and the details will not be described here.

The pivot serves as means for pivotally mounting the forward end of a longitudinally extending draft member 28, the rear end of which is apertured at 29 for connection to implements or vehicles to be towed by the tractor. The rear ends of the hitch bars 24 are rigidly cross connected by a first transverse member 30 which is disposed below and sustains the draft member 28. Bolts 31 are shown as representing means by which the opposite ends of the transverse member 30 are respectively connected to the rear ends of the hitch bars 24. Since the section of the draft member 28 is heavier than that of the hitch bars 24, spacers 32 are provided at the connections between the member 30 and the rear ends of the bars 24.

The rear ends of the bars 24 are further cross connected by a second transverse member, preferably in the form of a piece of angle section 33 having a relatively short horizontal flange 34 and a relatively long vertical flange or web 35. Opposite end portions of the member or piece 33 are secured respectively to the rear ends of the hitch bars 24 by means of the bolts 31, previously described, which pass through the end portions of the horizontal flange 34 of the member 33. The rear face of the power take-off shaft housing 14 provides a mounting portion to which an intermediate portion of the vertical flange or web 35 is secured, as by a plurality of cap screws 36. The intermediate portion of the web 35 is cut out at 37 so that the power take-off shaft 15 is exposed and is available for use in driving auxiliary equipment used with the tractor.

Figure 2:
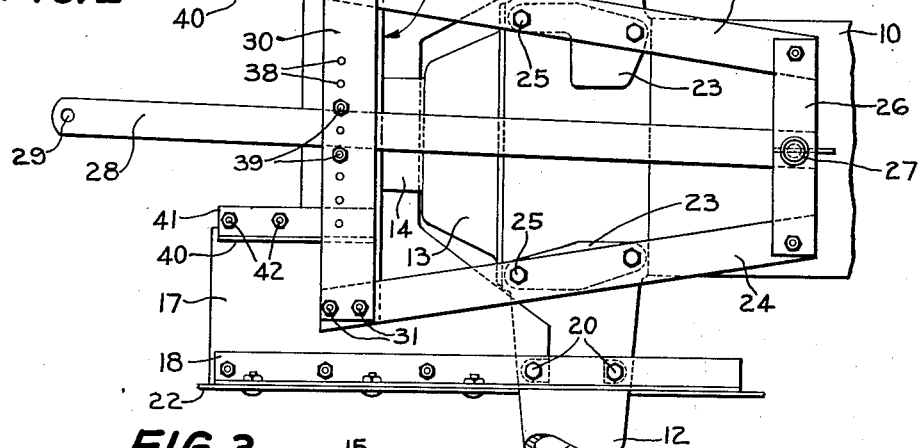
Figure 2 is a bottom view of the structure shown in Figure 1.
Figure 3:
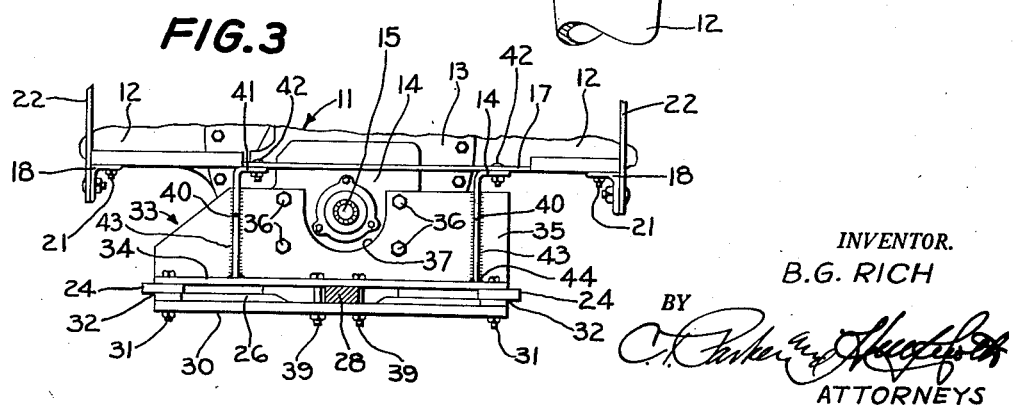
Figure 3 is a rear view of the structure shown in Figures 1 and 2.

The horizontal flange or web 34 of the member 33 is above the draft member 28 and the parts 34 and 30 provide a transverse guide within which the drawbar 28 may have lateral swinging about the pivot 27. The parts 30 and 34 are appropriately apertured in vertical alignment, as at 38 in Figure 2, and selected pairs of these apertures may receive a pair of bolts 39 for maintaining any selected lateral adjustment of the draft member. The bolts 39 may, of course, be omitted so that the lateral swinging of the drawbar will be free.

The transverse member 33 not only cross-connects the hitch bars 24 but secures these bars by means of the vertical web 35 to the power take-off shaft housing 14, whereby the member 33 supports the draw frame structure for both horizontal and vertical loading. In addition, the draw frame structure is connected to the transverse plate 17 comprising the platform between the angle bars 18. This means of connection preferably comprises a pair of transversely spaced elements in the form of gusset plates 40, each of which has a flanged upper end 41 rigidly secured by bolts 42 to transversely spaced portions of the platform or plate 17. Each gusset plate is generally in the form of a triangle and has a vertical edge welded at 43 to the rear face of the vertical web 35. A lower horizontal edge of each gusset plate is welded at 44 to the horizontal flange or web 34 of the member 33.

From the foregoing description, it will be seen that the improved rear end construction for the tractor includes a plurality of mounting portions, including the relatively closely spaced pair 23, the relatively outwardly spaced pair 19 and the central mount provided by the power take-off shaft housing 14. These portions are tied together by relatively few structural members in such manner that the parts mutually support each other. The arrangement is also such that either the platform structure or the draw frame structure may be removed independently of the other.

Features of the invention other than those specifically enumerated or referred to above will undoubtedly occur to those skilled in the art. Likewise, numerous modifications and alterations will be suggested by the preferred form of the invention illustrated, all of which may be resorted to without departing from the spirit and scope of the invention as defined in the appended claims.

What is claimed is:

1. For a tractor having a longitudinal body from which axle housings extend laterally outwardly at opposite sides, each housing having a mounting surface above the general level of the bottom of the body and the body including a generally centrally disposed rear power take-off housing from which a power take-off shaft projects rearwardly at a level between the level of the axle housing mounting surfaces and the level of the bottom of the body: a rear end construction, comprising a pair of supports spaced laterally apart and secured to and projecting rearwardly from the axle housing mounting surfaces to straddle the power take-off shaft; a transverse plate disposed above the power take-off shaft and rigidly cross-connecting said supports; a pair of hitch bars spaced laterally apart and secured to and extending rearwardly from the bottom of the body below the power take-off shaft; a member extending rearwardly between the bars and below the power take-off shaft; a transverse member interconnecting the rear ends of the bars below and sustaining the draft member; an angle bar having a transverse horizontal flange cross-connecting the rear ends of the bars and lying above the draft member and below the power take-off shaft, and a transverse vertical flange lying across and secured to the power take-off housing and being formed to expose the power take-off shaft; and vertical, longitudinal gusset members spaced apart laterally between said horizontal flange and the aforesaid transverse plate, each having a plurality of edges rigidly secured respectively to the angle bar flanges and to said transverse plate.

2. For a tractor having a longitudinal body from which axle housings extend laterally outwardly at opposite sides, each housing having a mounting surface above the general level of the bottom of the body and the body including a generally centrally disposed rear power take-off shaft projecting rearwardly at a level between the level of the axle housing mounting surfaces and the level of the bottom of the body: a rear end construction, comprising a pair of supports spaced laterally apart and secured to and projecting rearwardly from the axle housing mounting surfaces to straddle the power take-off shaft; a transverse plate disposed above the power take-off shaft and rigidly cross-connecting said supports; a pair of hitch bars spaced laterally apart and secured to and extending rearwardly from the bottom of the body below the power take-off shaft; a draft member extending rearwardly between the bars and below the power take-off shaft; a transverse member interconnecting the rear ends of the bars below and sustaining the draft member; a second transverse member cross-connecting the rear ends of the bars and lying above the draft member and below the aforesaid transverse plate; means securing said second transverse member to the power take-off housing, said means being formed to expose the power take-off shaft; and means rigidly securing the transverse plate to the second transverse member and to the power take-off housing.

3. For a tractor having a longitudinal body from which axle housings extend laterally outwardly at opposite sides, each housing having a mounting surface above the general level of the bottom of the body and the body including a generally centrally disposed rear power take-off housing from which a power take-off shaft projects rearwardly at a level between the level of the axle housing mounting surfaces and the level of the bottom of the body: a rear end construction, comprising a pair of supports spaced laterally apart and secured to and projecting rearwardly from the axle housing mounting surfaces to straddle the power take-off shaft; a transverse plate disposed above the power take-off shaft and rigidly cross-connecting said supports; a pair of hitch bars spaced laterally apart and secured to and extending rearwardly from the bottom of the body below the power take-off shaft; a draft member extending rearwardly between the bars and below the power take-off shaft; a transverse member interconnecting the rear ends of the bars below and sustaining the draft member; a second transverse member secured intermediate its ends to the power take-off housing and being formed to expose the power take-off shaft; means rigidly securing the member at each of its opposite ends to both the hitch bars and to the transverse plate.

4. For a tractor having a longitudinal body from which axle housings extend laterally outwardly at opposite sides, each housing having a mounting surface above the general level of the bottom of the body and the body including a generally centrally disposed rear power take-off housing from which a power take-off shaft projects rearwardly at a level between the level of the axle housing mounting surfaces and the level of the bottom of the body: a rear end construction, comprising a pair of supports spaced laterally apart and secured to and projecting rearwardly from the axle housing mounting surfaces to straddle the power take-off shaft; a transverse plate disposed above the power take-off shaft and rigidly cross-connecting said supports; a pair of hitch bars spaced laterally apart and secured to and extending rearwardly from the bottom of the body below the power take-off shaft; a draft member extending rearwardly between the bars and below the power take-off shaft; a transverse member interconnecting the rear ends of the bars below and sustaining the draft member; a second transverse member secured intermediate its ends to the power take-off housing and being formed to expose the power take-off shaft and having opposite end portions respectively proximate and secured to the rear ends of the hitch bars; a pair of laterally spaced, vertical compression-tension elements extending between the under portion of the aforesaid transverse plate and the rear ends of the hitch bars; means rigidly securing said elements respectively to opposite end portions of the second transverse member; and means rigidly securing said elements to the transverse plate.

5. For a tractor having a longitudinal body from which axle housings extend laterally outwardly at opposite sides, each housing having a mounting surface above the general level of the bottom of the body and the body including a generally centrally disposed rear mounting portion at a level between the level of the axle housing mounting surfaces and the level of the bottom of the body: a rear end construction, comprising a pair of supports spaced laterally apart and secured to and projecting rearwardly from the axle housing mounting surfaces to straddle the rear mounting portion; a transverse plate disposed above said mounting portion and rigidly cross-connecting said supports; a pair of hitch bars spaced laterally apart and secured to and extending rearwardly from the bottom of the body below the rear mounting portion; a draft member extending rearwardly between the bars and below said mounting portion; a transverse member interconnecting the rear ends of the bars below and sustaining the draft member; an angle bar having a transverse horizontal flange cross-connecting the rear ends of the bars and lying above the draft member and a transverse vertical flange lying across and secured to the rear mounting portion; and vertical, longitudinal gusset members spaced apart laterally between said horizontal flange and the aforesaid transverse plate, each having a plurality of edges rigidly secured respectively to the angle bar flanges and to said transverse plate.

6. For a tractor having a longitudinal body from which axle housings extend laterally outwardly at opposite sides, each housing having a mounting surface above the general level of the bottom of the body and the body including a generally centrally disposed rear mounting portion at a level between the level of the axle housing mounting surfaces and the level of the bottom of the body: a rear end construction, comprising a pair of supports spaced laterally apart and secured to and projecting rearwardly from the axle housing mounting surfaces to straddle the rear mounting portion; a transverse plate disposed above said mounting portion and rigidly cross-connecting said supports; a pair of hitch bars spaced laterally apart and secured to and extending rearwardly from the bottom of the body below the rear mounting portion; an angle bar having a transverse horizontal flange cross-connecting the rear ends of the bars and a transverse vertical flange lying across and secured to the rear mounting portion; and vertical, longitudinal gusset members spaced apart laterally between said horizontal flange and the aforesaid transverse plate, each having a plurality of edges rigidly secured respectively to the angle bar flanges and to said transverse plate.

7. For a vehicle provided with a longitudinal body including a transverse rear axle structure and having a body portion rearwardly of the axle structure: a draft frame and support structure, comprising first and second pairs of laterally spaced longitudinal members secured to the body and extending rearwardly of the axle structure at different levels and at opposite sides of the rear body portion; a pair of transverse members spaced apart vertically and respectively interconnecting the rear ends of the longitudinal members behind the rear body portion; a transverse generally vertical web rigidly secured to the rear body portion and having a horizontal edge secured to one of the transverse members; and a pair of transversely spaced, vertical load-supporting elements between and rigidly secured to both transverse members and to the web.

8. For a tractor having a longitudinal body including a transverse rear axle structure provided with a rear intermediate housing portion from which a power take-off shaft projects rearwardly: a drawbar structure, comprising a pair of longitudinal bars spaced laterally apart and extending fore and aft of the axle structure, one at either side of the power take-off shaft; means for rigidly securing said bars to the axle structure; means rigidly interconnecting the forward ends of the bars ahead of the axle structure; a transverse horizontal member rigidly cross-connecting the rear ends of said pair of bars; a transverse angle member having a transverse horizontal flange spaced above and closely paralleling the transverse member, and a transverse vertical flange crosswise of and adjacent the rear intermediate housing portion of the axle structure from which the power take-off shaft extends, said vertical flange being formed intermediate its ends to expose the power take-off shaft; means for securing the horizontal flange at its opposite ends to the transverse member; means for securing the vertical flange to said rear intermediate housing portion; and a longitudinal draft member pivotally connected for lateral swinging movement at its forward end to the aforesaid means that interconnects the longitudinal bars, said draft member extending rearwardly through said spaced apart transverse member and horizontal flange of the transverse angle member.

BARRETT G. RICH.

REFERENCES CITED

The following references are of record in the file of this patent:

UNITED STATES PATENTS

| Number | Name | Date |
|---|---|---|
| 1,332,524 | Sloan | Mar. 2, 1920 |
| 1,372,396 | Blackburn | Mar. 22, 1921 |
| 1,715,682 | Starks | June 4, 1929 |
| 1,715,779 | Paradise | June 4, 1929 |
| 2,092,584 | Mott | Sept. 7, 1937 |
| 2,349,923 | Anderson et al. | May 30, 1944 |

Certificate of Correction

Patent No. 2,528,784

November 7, 1950

BARRETT G. RICH

It is hereby certified that error appears in the printed specification of the above numbered patent requiring correction as follows:

Column 4, line 13, before the word "member" insert *draft*; and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*